United States Patent [19]
Ferone et al.

[11] 4,453,894
[45] Jun. 12, 1984

[54] INSTALLATION FOR CONVERTING THE ENERGY OF THE OCEANS

[76] Inventors: Gabriel Ferone, 16 Place de la nation, 75012 Paris; Ferdinand Ferone, 12 rue de l'Archeveché, 94220 Charenton le Pont, both of France

[21] Appl. No.: 359,358

[22] Filed: Mar. 18, 1982

Related U.S. Application Data

[63] Continuation of Ser. No. 182,131, Aug. 28, 1980, abandoned, which is a continuation of Ser. No. 949,274, Oct. 6, 1978, abandoned.

[30] Foreign Application Priority Data

Oct. 14, 1977 [FR] France .................................. 77 30924
Sep. 22, 1978 [FR] France .................................. 78 27269

[51] Int. Cl.³ .......................... F04B 17/00; F04B 35/00
[52] U.S. Cl. ....................................... 417/332; 60/505; 60/506; 60/499
[58] Field of Search ................ 60/497, 499, 500, 501, 60/505, 506, 507; 417/331, 332

[56] References Cited

U.S. PATENT DOCUMENTS

| | | | |
|---|---|---|---|
| 3,970,415 | 7/1976 | Widecrantz | 417/332 |
| 4,076,463 | 2/1978 | Welczer | 60/497 X |
| 4,111,610 | 9/1978 | Brown | 60/506 |

*Primary Examiner*—Allen M. Ostrager
*Attorney, Agent, or Firm*—Holman & Stern

[57] ABSTRACT

An installation for exploiting the energy of oceans, comprising at least one floating-member, or float, capable of moving along the surface of the sea under the action of waves, at least one reference-member deeply submerged, said reference-member being substantially unaffected by the waves and at least one variable-capacity hydraulic device, said device comprising a fixed member connected to said reference-member and a movable member, adapted to slide with respect to said fixed member, said movable member being connected to said float.

5 Claims, 10 Drawing Figures

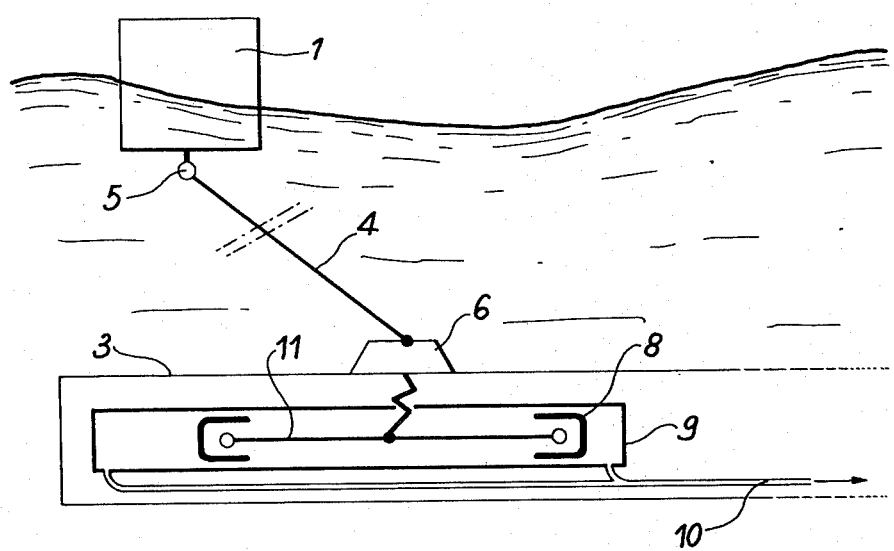
FIG. 1
FIG. 2
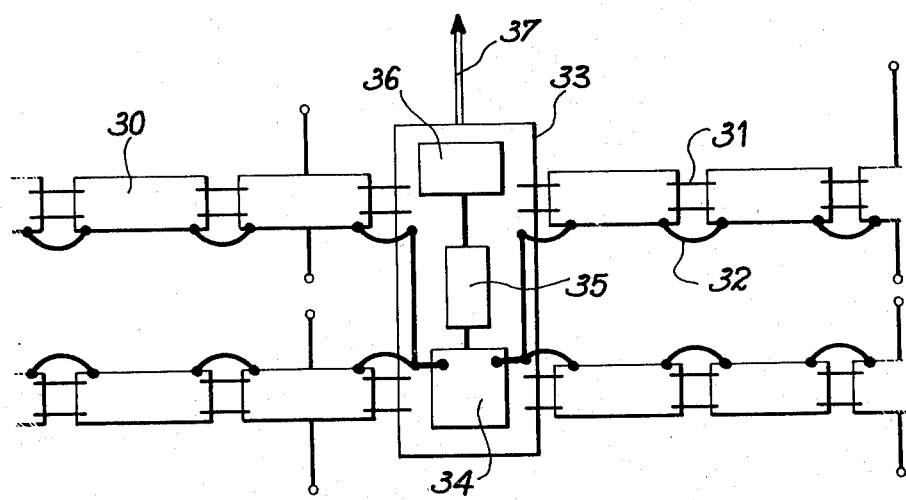

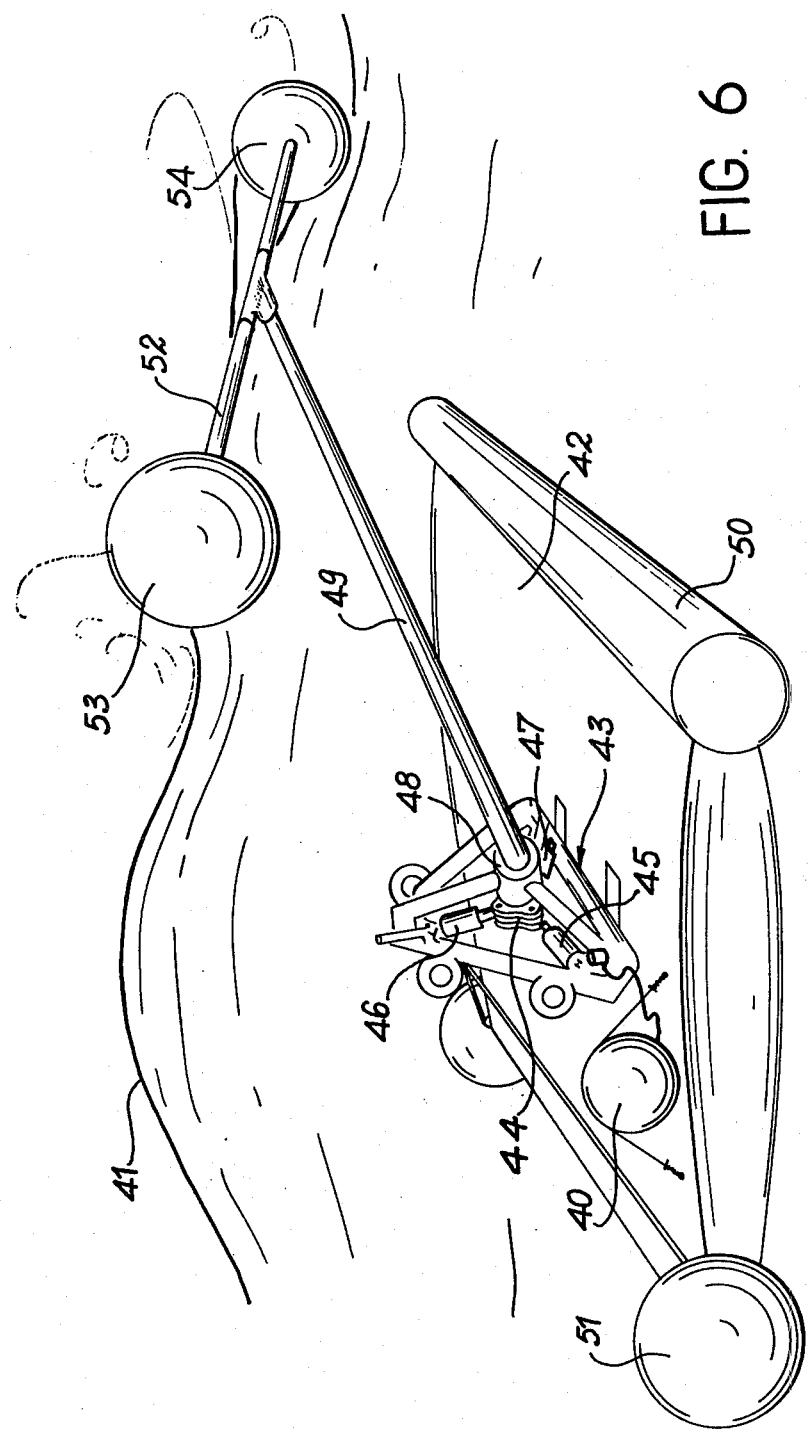

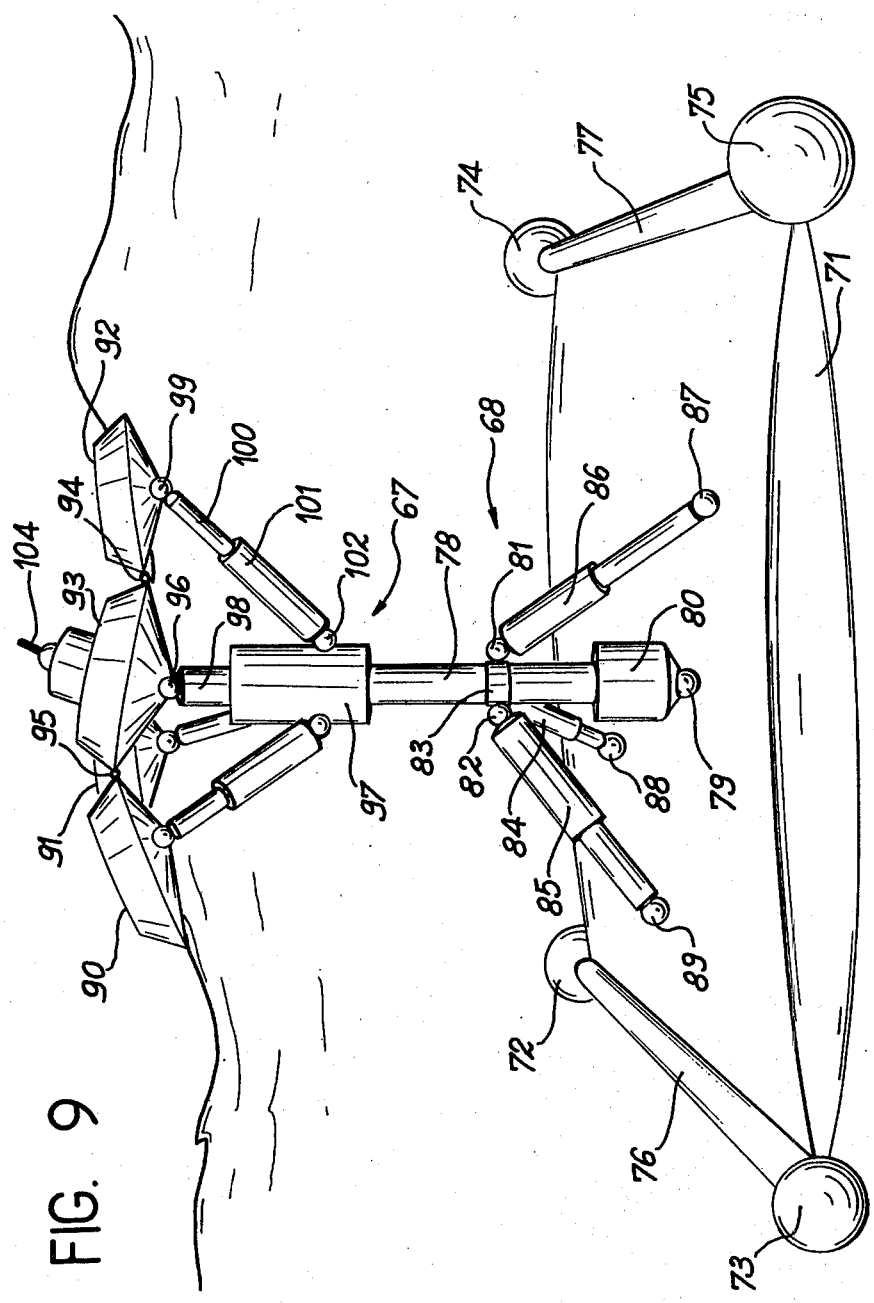

INSTALLATION FOR CONVERTING THE ENERGY OF THE OCEANS

This is a continuation of application Ser. No. 182,131, filed Aug. 28, 1980 which in turn is a continuation of application Ser. No. 949,274 filed Oct. 6, 1978, both now abandoned.

The present invention relates to the generation of energy for household and industrial purposes, from the energy liberated in oceans in the form of waves and surge. Its main object is to permit the exploitation of the latter energy by means of an installation which can be built and operated without those insuperable technical problems inherent to the previously proposed installations.

This novel installation comprises at least one floating member, or float, partially immersed under the sea-level so that, under the action of waves, it will be moved permanently, mainly in the form of vertical reciprocating motions, on the one hand, and a member which is substantially unaffected by waves, on the other hand. The latter member, in fact, constitutes a substantially immovable reference device for the whole installation. Said member is preferably in the form of a large-area wing horizontally immersed in the sea, but it may, in addition, be retained by any other means, e.g. by anchor-buoys having contingently a certain degree of resiliency, the main consideration being, however, that, with respect to the floating member undergoing the action of waves, said reference-member behaves like a substantially immovable member.

In cooperation with the floating member, or float, and said reference member, there is provided a variable-capacity hydraulic machine, as well as connecting and motion-transmitting mechanical means adapted to cause said capacity to vary according to the float motions. A hydraulic circuit is provided for converting the thus-collected energy, or power, into electric current in a submerged or partially submerged power-station mounted on the site.

Accordingly, the installation according to the present invention contains at least one hydraulic device of variable capacity, comprising a fixed member, usually a pump-body connected to the reference-member, and a mobile member, usually a piston adapted to slide in said pump-body and connected to the float. However, the installation according to the invention should preferably, according to the production-rate requested therefrom, contain a plurality of similar hydraulic devices with the capacities thereof connected in parallel to a single hydraulic-fluid circuit, through flap-valves adapted to regulate the flow of hydraulic fluid in a manner known per se.

It is preferable that the hydraulic system should comprise at least three apparatus, each with two mutually telescoping members (body and piston), said apparatus being mutually arranged according to a symmetry of revolution of a corresponding order, viz. at least a ternary symmetry.

According to a preferred embodiment, three such devices are each connected to the reference member by one of their extremities, viz. to the three apices of a triangle, respectively. Preferably, one of the members of the pumps, which can be called the fixed member, or body, is attached to the reference member by means of a swivel-joint or through a similar articulated coupling device.

At the other extremity thereof, each of the three apparatus is directly or indirectly connected, through its so-called mobile member, or piston, to the float. Preferably, the connection is also provided by swivel-joints or similar articulated coupling devices, at relatively closely-spaced points. A specially advantageous arrangement consists in three such hydraulic apparatus aligned along the edges of a trirectangular trihedron, the apex of which is under the float or is connected to the latter through a transmission lever, the length of which is not critical.

Other features of the present invention will appear from the following description of various embodiments, given merely by way of explanation, with respect to the following drawing, in which:

FIG. 1 diagrammatically illustrates the principle of an installation according to the invention, of a simple type;

FIG. 2 represents the arrangement of the various parts of a full installation according to the invention;

Figure 10:
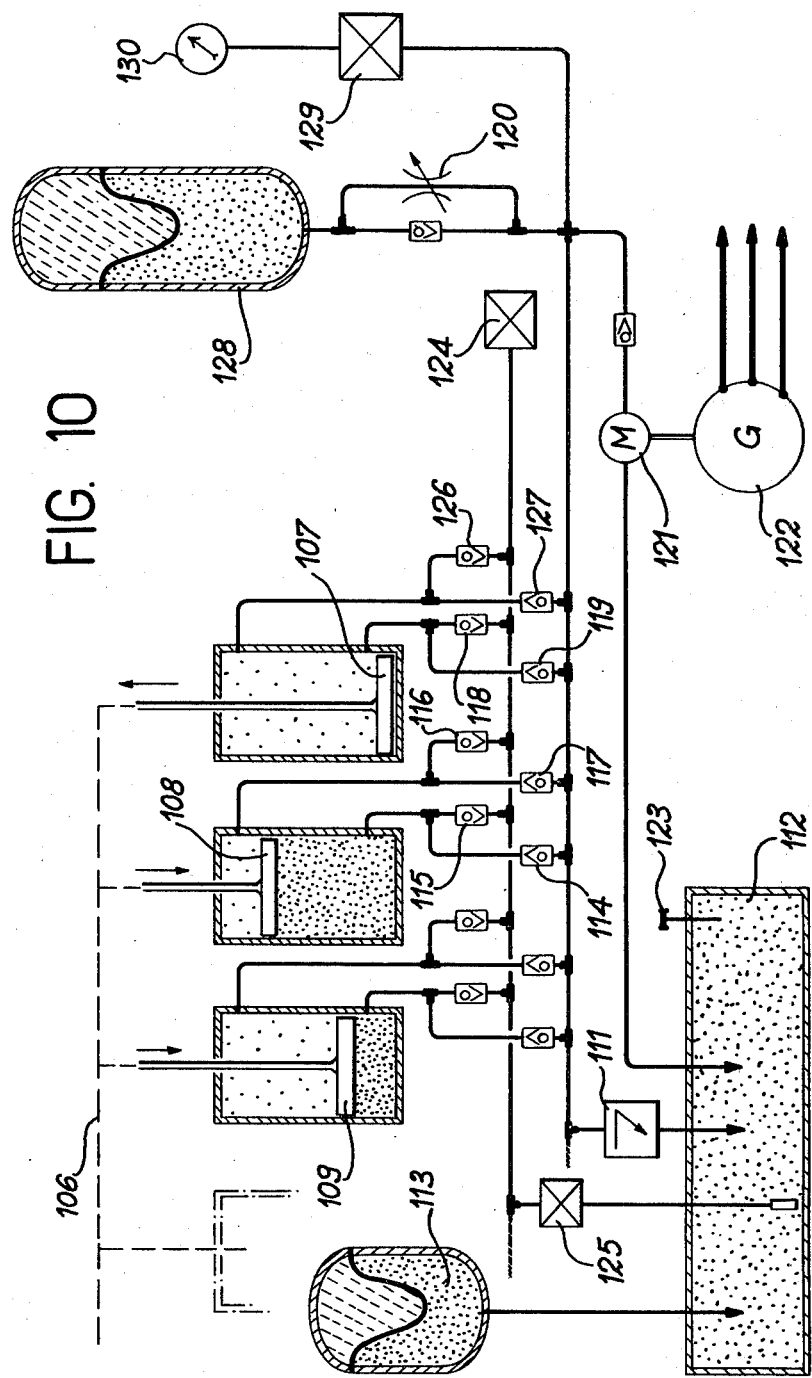

FIGS. 6 to 9 diagrammatically represent four different embodiments respectively, each of which comprises at least one series of three piston pumps arranged according a ternary symmetry of revolution about an axis connecting the float to the reference-member; and FIG. 10 illustrates the principle of a corresponding hydraulic circuit.

Float 1, as diagrammatically shown in FIG. 1, partially immersed and floating at the surface of the sea, is adapted to follow the motions of the waves and surge. Said float is connected to a fully submerged member, consituted by a wing 3 of large area, which floats horizontally at an average depth.

The connection is provided by an arm 4, articulated, at one of its extremities, about float 1 by means of a swivel-joint 5, and the other extremity of which is attached to a gearing-down mechanical transmission device 6 actuating a reciprocating pump. Said pump, which is a double-acting one is diagrammatically shown in FIG. 1 by pistons 8 and cylinder 9, the latter communicating, through conventional valves, with circuit 10 for circulating a hydraulic fluid, viz. oil in the present instance. Transmission device 6 is adapted to transform the movements of float 1, as transmitted by arm 4, into a movement of reciprocating translation imparted to rod 11 integral with the pump two pistons.

Figure 3:
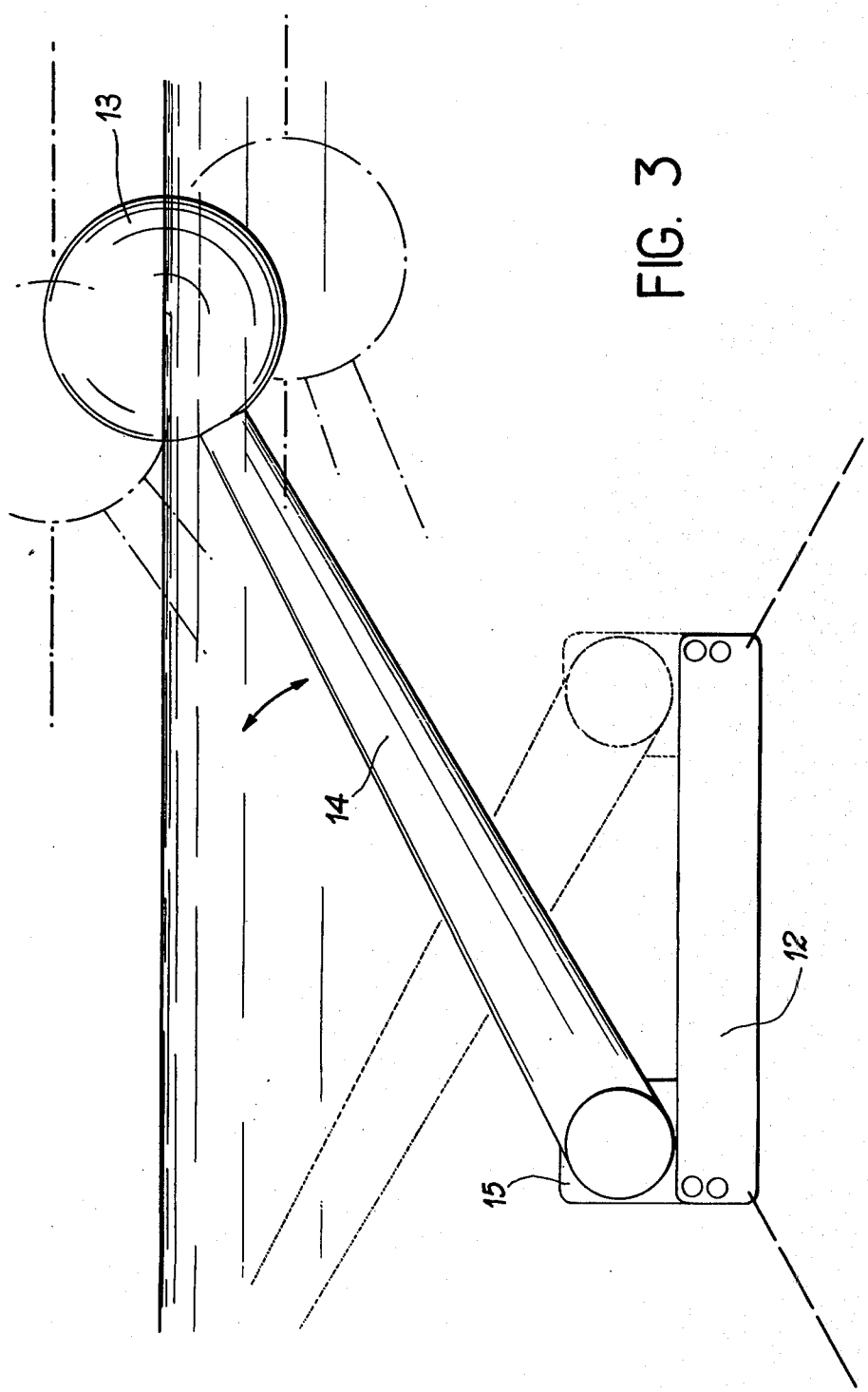
FIG. 3 shows how a floating device, or float, is connected to the respective immersed member.

As shown in FIG. 3, a wing 12 similar to the above-mentioned one can be provided with several floats 13, each of which is connected to a pump 15 by an arm 14. The various pumps are integral with wing 12 and attached to the latter, with mutual spacings sufficient for preventing the arms of the respective floats from interfering with one another in the course of the movements thereof. Wing 12, in the horizontal plane, has a width and a length which are relatively large with respect to surge undulations, e.g. 50 meters by 10 meters. It is immersed to a depth of usually 5 to 20 meters below the level of the floats. Each of the latter forms a volume not quite unlike that of a sphere, e.g. a cube with all the apices thereof truncated.

Said wing can have a volume of, e.g., 10 cu. meters and be of such specific weight as to be half submerged.

Figure 4:
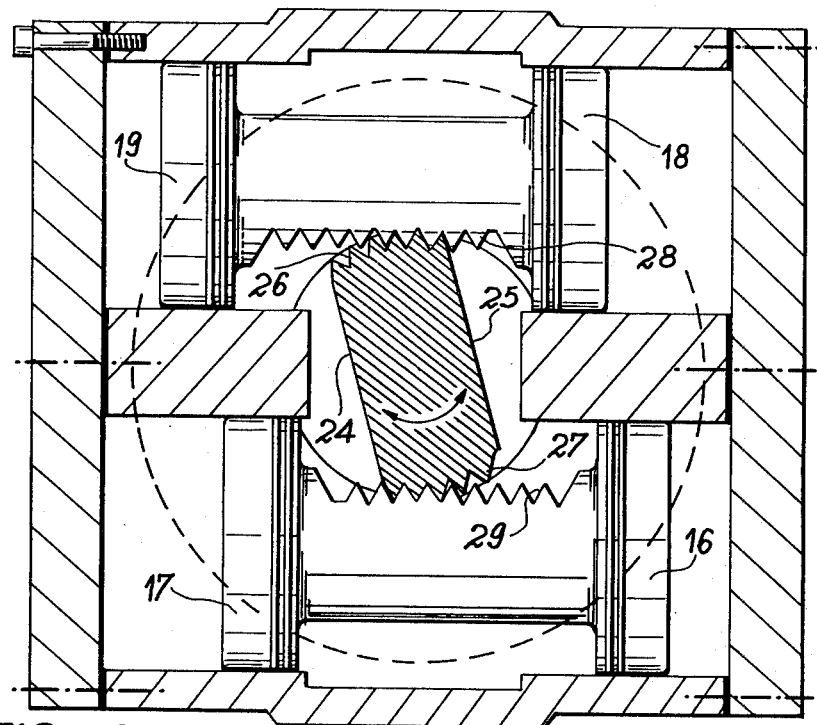
FIG. 4 represents a pump of the installation, in horizontal cross-section.
Figure 5:
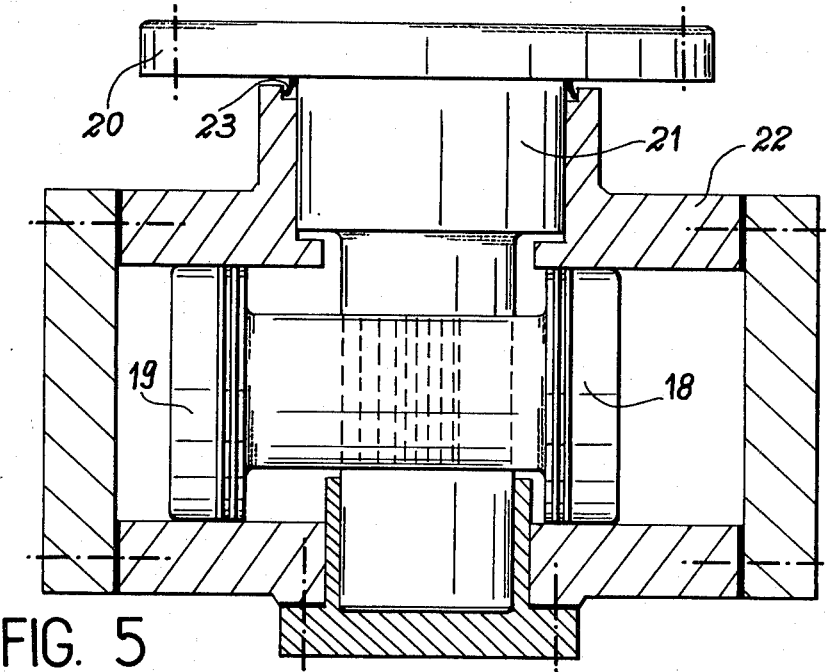
FIG. 5 represents the same pump, in vertical section.
Figure 8:
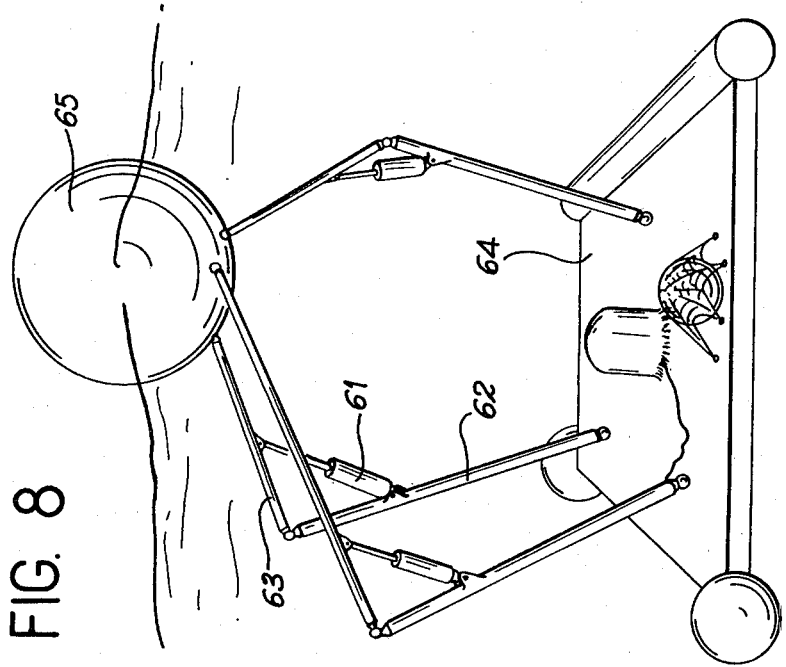

According to the embodiment shown in FIGS. 4 and 5 by way of example, each pump is provided with four pistons (16 to 19). A plate 20, at the end of the float-arm, is integral with a shaft 21 rotatively mounted in the body 22 of the pump, tightness being achieved by means of sealing-joint 23. In the middle portion of pump body 22, shaft 21 is provided on its outer periphery with sets of teeth 26, 27, between two flat portions 24, 25, said sets of teeth being in mesh with racks formed in the rods of piston-pairs 18-19 and 16-17, respectively.

FIG. 2 shows how a high-power installation can be obtained by mounting basic installations of the type just described in parallel in the hydraulic fluid circuit.

Wings 30, each of which is provided, e.g., with five floats, are mutually connected by mechanical connections 31 so articulated as to permit vertical swinging movements, on the one hand, and by flexible junctions 32 of the hydraulic circuit, on the other hand. In addition, each of these wings, in order not to drift, is retained by anchor-buoys loosely anchored to the sea-floor.

The installation according to the invention also comprises a power-station 33, mounted on a half-submerged or fully-submerged floating platform, adapted to generate electric power from the hydraulic power collected by the various pumps. Said power-station contains a reservoir 34 of the hydraulic circuit, in common for the various assembled members, a turbine 35 and an alternator 36. Electric current thus generated feeds a consumption or distribution network through a cable 37.

The installation according to the present invention may have a number of forms. It is highly versatile and can easily be rendered suitable for each specific instance, in particular according to the power requested and to the physical conditions prevailing on the site, e.g. nature of the sea-floor, type of surge or type of undercurrents. The various parts, or members, can be mass-produced, separately tugged and mounted in situ. The installation according to the invention is specially adapted for solving the problems set by tides and by surges of variable length and through-depth as occurs in oceans.

The embodiments described by way of examples with reference to FIGS. 6 to 9 have been so designed as to ensure production-rates increasing in the same order.

In FIG. 6 is shown, at 41, the sea-level and, at 42, the submerged wing floating at mid length, said wing being the so-called reference-member and being of any type in agreement with the present invention.

Floating wing 42 is counter-balanced by cylindrical ballast-tank 50, in its front portion, and by two spherical ballast-tanks 51, at its rear portion. With a view to improving efficiency, the wing balance can be achieved by controlling said ballast-tanks by means of a microprocessor and of valves with a servo-motor.

The floating wing carries a hydraulic circuit similar to the one to be described later on, said circuit being possibly associated with a station for converting the power as available in the form of hydraulic power into electric power. For the sake of simplification, in FIG. 6 is merely represented a tank 40 serving as an accumulator.

On wing 42 is mounted structure 43 essentially comprising three beams forming the sides of an equilateral triangle and a central part 48. Three reciprocating piston-pumps 45-47, or jacks, respectively connect each of the apices of said triangle to one of the ends of a lever-arm 49. In each of said pumps, the pump-body is connected, by one end, to structure 43, at a respective apex of said triangle, by an articulated coupling system of the pivoting or swiveling type, whereas, at the other end, the piston sliding within the respective pump-body is connected to flanges 44 forming the base of the lever-arm, also by an articulated coupling system.

Lever-arm 49, of relatively great length, is seated, by means of a ball-and-socket joint in the central part 48 of the structure integral with the floating wing. At the other end thereof, said lever-arm is integral with an arm 52, at right angles thereto. The extremities of the latter arm are connected, by means of articulated coupling systems, to floating-members, or floats, 53, 54, respectively, the latter being similar and floating, partially immersed, at the surface of the sea.

The mechanical system of FIG. 6 thus comprises a lever with two degrees of freedom, adapted to transmit the movements of the floating combination to the pump-pistons, thus actuating the hydraulic circuit.

Figure 7:
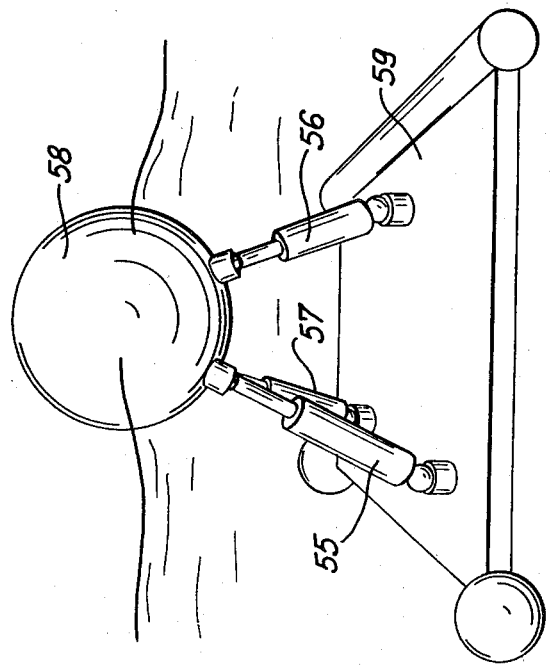

In the embodiment of FIG. 7, there is provided a third degree of freedom. In this instance, three pumps 55-57, similar to those of FIG. 1, are arranged along the edges of a trirectangular trihedron. Their respective pistons, converging towards the axis of symmetry of revolution, are directly connected to the bottom portion of a float 58 by respective swivel-couplings (ball-and-socket joints) said float being of spherical shape in the present case. At the respective opposite extremities of the pumps, the respective pump-bodies are fixed, by ball-and-socket joints, to floating-wing 59, similar to the wing of FIG. 1, at the three apices of an equilateral triangle.

Depending on the direction of the sea movements, each piston separately is more or less strongly urged and the apparatus is permanently under the most favourable conditions for recovering forces, the directions of which are distributed haphazard.

In the variant shown in FIG. 8 is to be found again a triangular structure with three pumps 61; however, each of the latter forms part of a mechanical system in which it is associated with two contiguous articulated arms 62, 63, similar to those of a pantograph, arranged as shown in the figure and pivotally mounted, by means of ball-and-socket joints, on floating-wing 64, on the one hand, and on float 65, on the other hand, each of said pumps having its body and its piston connected to a respective arm of the corresponding pantograph.

In FIG. 9 is diagrammatically shown a still further embodiment, more elaborate than the previous ones and suitable for the generation of high powers. In this embodiment, the installation according to the invention comprises two sets (67, 68) of three pumps each, the pumps in each set being arranged according to a trihedron with equal angles as in FIG. 7.

In the whole installation, these two sets are mounted in head-to-tail fashion, the apices of the two trihedrons being more closely spaced than the respective triangular bases.

The floating wing 71, stabilized at four places by means of ballast-tanks 72-75 (of spherical shape in the figure) is maintained at the required depth in the sea by means of ballast-tanks 76 and 77 (of cylindrical shape in the figure). A large median piston 78 rests, in the central portion of the wing, on a ball-and-socket joint 79, through a jack 80.

By means of ball-and-socket joints 81, 82, visible in the figure, and of a third similar joint, not visible, angularly spaced by 120 degrees from one another on a collar, or flange, 83, in one piece with piston 78, the latter piston is connected to jacks 84, 85, 86, which are, in their turn, connected to floating wing 71 by means of ball-and-socket joints 87, 88, 89.

Three floats 90, 91, 92, are mounted about a central float 93, by means of ball-and-socket joints 94, 95, visible in the figure and another ball-and-socket joint angularly spaced from the first two by 120 degrees, said third joint being fixed to the periphery of the central float and not visible in the figure.

Central float 93 is connected, by a ball-and-socket joint 96, to large central piston 78 through twin-jack 97 and piston 98. Floats 90, 91, 92, are each connected to said twin-jack by means of a ball-and-socket joint 99, a piston 100, a jack 101 and a further ball-and-socket joint 102, the angular spacings between similar members being still 120 degrees, in agreement with the ternary symmetry of revolution adopted.

The central float supports a power-generator and a broadcasting system, shown at 104.

The movements of the sea induce movements of the whole system and of each float with respect to the environment thereof, and the forces involved are converted into hydraulic power according to the same principle as disclosed with respect to FIG. 7.

According to the diagram of hydraulic operation shown in FIG. 10, the energy of the sea is transmitted from the combination of floats to the various parallelly mounted pump-pistons or jacks, through a transmission system such as lever-arm 106, corresponding to lever-arm 49 of FIG. 1. Only three pistons 107-109 have been represented in the figure. Piston 107 is withdrawn and, accordingly, compresses the oil contained in the upper body of the jack containing piston 107 as the piston moves upwardly on the cylinders. Said oil being compressed, valve 126 is caused to close and the oil through valve 127, thus opening the latter, said oil serving to fill tank 128 and to compress the air contained in the upper portion thereof; numeral 129 designates a safety-valve, and 130 a pressure-gauge. Another safety-valve 111 allows the oil to return directly to reservoir 112, containing a supply of low-pressure oil, the pressure of which is stabilized, under the sea-level, by a tank 113, the upper portion of which is submitted to the sea-pressure, which compensates the pressures due to depth, throughout the circuits.

While piston 107 is thus caused to move upwardly, piston 108 moves downwards, thus compressing the oil contained in the lower portion of its cylinder; said oil being driven to tank 128 through valve 114, valve 115 being closed. A suction is generated in the upper portion of its cylinder and, through valve 116, the oil is drawn from reservoir 112 through non-return valve 125. The same phenomenon occurs at the cylinder of lower portion of the jack piston 107 as it moves upwardly: valve 118 being open, valve 119 is closed and the oil is drawn from the reservoir 112 and fills the lower body of the cylinder as the piston is moving upwardly.

It is to be noted that, whatever be the directions of the movements, the double-acting pistons operate perform a pumping function in both directions of operation.

As soon as pressure is high enough inside tank 128, programmed-pressure valve 120 allows the oil to reach hydraulic motor 121, integral with generator 122 adapted to generate electric current, compressed air or steam, or any other device. The oil used is returned to reservoir 112, protected by an overpressure valve 123. Valve 124 is used for exhausting the air during the oil filling operation. Said valve can be piloted. Oil-filters, not shown, are mounted between the reservoir and the jacks, together with safety-valves serving to prevent the oil from being poured into the sea, should the circuit happen to be broken.

The various hydraulic circuits may obviously be altered or completed so as to meet the requirements of the various embodiments of the installation.

The various particular features disclosed in the above description could also be combined in many other ways without departing from the scope of the invention as set forth in the following claims.

We claim:

1. An installation for exploiting the energy of oceans comprising:
    floating means located at the ocean surface and subjected to the effect of ocean weight;
    reference support means in the form of a large flat member extending horizontally at a location spaced from both the ocean bottom and the surface at a sufficient depth to be substantially unaffected by ocean waves;
    hydraulic circuit means containing a hydraulic fluid and means responsive to the forces exerted on said hydraulic fluid for providing useful energy;
    at least three elongated hydraulic devices with variable capacities connected in parallel to said hydraulic circuit means, each hydraulic device comprising a fixed member and a movable member; and
    means connecting said fixed member to said reference support means and connecting said movable member to said floating means at locations with respect to a vertical reference line between said floating means and said reference support means such that said movable members move along a path inclined with respect to said reference line and are spaced equally distributed about said reference line.

2. The installation of claim 1, wherein said connecting means including respective ball and socket connection means for connecting each fixed member to said reference support means to permit said fixed member to freely swivel with respect to said reference support means.

3. The installation according to claims 1 or 2, wherein said connecting means includes respective ball and socket connection means for connecting each movable member to said floating means to permit said movable member to freely swivel with respect to said floating means.

4. The installation according to claims 1 or 2, wherein said floating means comprises:
    a plurality of buoyant float members; and
    swivel connection means interconnecting said plural float members.

5. The installation according to claim 4, wherein one of the float members is a central float member and wherein said hydraulic devices comprise:
    a central jack and piston device, including first and second members, extending between said central float member and said reference support means;
    a first plurality of inclined jack and piston devices extending from said first member of said central jack and piston device to equally spaced attachment locations on said reference support means; and
    a second plurality of inclined jack and piston devices extending from said second member of the central jack and piston device to respective float members, said respective float members being disposed symmetrically about said central float member.

* * * * *